United States Patent [19]

Kennoki et al.

[11] Patent Number: 5,334,653
[45] Date of Patent: Aug. 2, 1994

[54] POLYESTER FIBER COATING COMPOSITIONS

[75] Inventors: Masakado Kennoki; Isao Ona; Masaru Ozaki, all of Chiba, Japan

[73] Assignee: Dow Corning Toray Silicone Co., Ltd., Tokyo, Japan

[21] Appl. No.: 936,150

[22] Filed: Aug. 26, 1992

[30] Foreign Application Priority Data

Aug. 30, 1991 [JP] Japan ............... 3-247033

[51] Int. Cl.$^5$ ............................... C08L 83/08
[52] U.S. Cl. .................... 524/714; 524/717; 524/755; 524/760; 524/838; 524/864; 528/38
[58] Field of Search .............. 528/38; 524/864, 838, 524/717, 714, 755, 760

[56] References Cited

U.S. PATENT DOCUMENTS

| | | | |
|---|---|---|---|
| 4,359,545 | 11/1982 | Ona et al. | 524/262 |
| 4,366,001 | 12/1982 | Ona et al. | 106/287.11 |
| 4,399,247 | 8/1983 | Ona et al. | 524/204 |
| 4,419,391 | 12/1983 | Tanaka et al. | 427/387 |
| 4,427,815 | 1/1984 | Ona et al. | 524/315 |
| 4,459,382 | 7/1984 | Ona et al. | 524/860 |
| 4,584,342 | 4/1986 | Kondow | 524/860 |
| 4,902,739 | 2/1990 | Ona et al. | 524/588 |
| 5,025,076 | 6/1991 | Tanaka et al. | 528/33 |
| 5,063,260 | 11/1991 | Chen et al. | 523/213 |

FOREIGN PATENT DOCUMENTS

| | | |
|---|---|---|
| 916544 | 12/1972 | Canada. |
| 33-009969 | 11/1958 | Japan. |
| 36-001293 | 3/1961 | Japan. |
| 50-048293 | 4/1975 | Japan. |
| 62-041379 | 2/1987 | Japan. |
| 1458319 | 12/1976 | United Kingdom. |
| 1598845 | 9/1981 | United Kingdom. |

OTHER PUBLICATIONS

Abstract of JP 4011081.
Abstract of DE 3930410.
Abstract JP 52081197.
Abstract of JP 53090421.

*Primary Examiner*—Ralph H. Dean
*Attorney, Agent, or Firm*—Timothy J. Troy

[57] ABSTRACT

A composition is disclosed which comprises an amino radical-containing organopolysiloxane and an organopolysiloxane containing at least 3 epoxy radical-containing organic groups in each molecule. The composition of the present invention imparts to polyester fibers excellent smoothness, elastic resilience, and compressive recovery, as well as a high resistance to permanent setting

18 Claims, No Drawings

POLYESTER FIBER COATING COMPOSITIONS

BACKGROUND OF THE INVENTION

This invention relates to a coating composition. More specifically, this invention relates to a polyester fiber coating composition characterized by the fact that it enables polyester fibers to acquire excellent smoothness, elastic resilience and compressive recovery, as well as high resistance to permanent setting.

Compared with fibers made of nylon, acryl resin, polyvinyl chloride, or polypropylene, polyester fibers have higher elastic resilience and compressive recovery, hence, they are preferably used as the staple fibers for padding cotton used in making comforters, pillows, kilting material, and the like. In conventional methods, polyester fibers are adhered to an organoalkoxysilane, such as an amino radical-containing alkoxysilane, or an epoxy radical-containing alkoxysilane to acquire feathery touch and fibrous characteristics, to improve elastic resilience and compressive recovery, and to reduce permanent setting by fatigue such as the methods disclosed in Japanese Patent Application Laid-Open [Kokai or Unexamined] Nos. 49-133698 [133,698/74], 50-48293 [48,293/75], and 62-41379 [41,379/87]. However, in these methods, the alcohol generated from the organoalkoxysilane used in processing pollutes the operation environment and may even cause fire hazard or explosion which are problems. In another method disclosed by Japanese Patent No. [Kokoku]48-17514 [17,514/73], the polyester fibers are processed using a mixture of an amino radical-containing organopolysiloxane and an epoxy radical-containing organopolysiloxane with a high degree of polymerization. However, although the polyester fibers processed using this method have excellent smoothness and lubricating properties, the elastic resilience end compressive recovery are nevertheless poor. This is a disadvantage.

SUMMARY OF THE INVENTION

In order to solve the aforementioned problems, the present inventors have performed extensive research. As a result of this research, this invention was reached. The purpose of this invention is to solve the aforementioned problems of the conventional methods by providing a polyester fiber coating composition characterized by the fact that it can impart to polyester fibers excellent smoothness, elastic resilience and compressive recovery, as well as high resistance to permanent setting.

The present invention therefore relates to a composition comprising: (A) 100 parts by weight of an amino radical-containing organopolysiloxane having the formula:

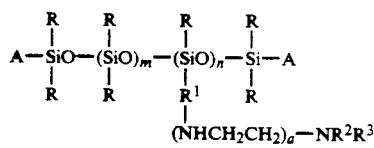

wherein R is a monovalent hydrocarbon radical having from 1 to 20 carbon atoms, $R^1$ is a divalent hydrocarbon radical, $R^2$ is a hydrogen atom or monovalent hydrocarbon radical, $R^3$ is a hydrogen atom or monovalent hydrocarbon radical, A is a hydroxy radical or an alkoxy radical, m is 1 or has a value greater than 1, n is 1 or has a value greater than 1, a is an integer from 0 to 5, said organopolysiloxane (A) having a viscosity of greater than 50 centistokes at 25° C., and (B) 1-50 parts by weight of an organopolysiloxane containing at least 3 epoxy radical-containing organic groups in each molecule and having the formula:

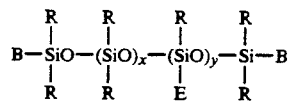

wherein R is a substituted or unsubstituted monovalent hydrocarbon radical, E is an epoxy radical-containing organic group, B is selected from the group consisting of substituted monovalent hydrocarbon radicals, unsubstituted monovalent hydrocarbon radicals, and epoxy radical-containing organic groups, x has a value from 0 to 25, y has a value from 1 to 30, and the value of x+y ranges from 1 to 30.

DETAILED DESCRIPTION OF THE INVENTION

According to this invention, the amino radical-containing organopolysiloxane used as component (A) can impart to the polyester fibers smoothness and softness end with the aid of the amino radicals can be adsorbed well onto the fibers. In addition, the amino radicals react with the epoxy radicals of component (B) to ensure excellent elastic resilience and compressive recovery.

In the aforementioned formula for component (A), R is a monovalent hydrocarbon radical having from 1 to 20 carbon atoms such as a methyl radical, ethyl radical, propyl radical, butyl radical, pentyl radical, cyclohexyl radical, vinyl radical, allyl radical, 3,3,3-trifluoropropyl radical, or phenyl radical. It is not necessary that all the R's be identical in one molecule. The R's are usually methyl radicals or a combination of methyl radicals and other radicals. Among R's, it is preferred that at least 50 mol % be methyl radicals. $R^2$ and $R^3$ are selected from the group consisting of a hydrogen atom and monovalent hydrocarbon radicals such as a methyl radical, ethyl radical, propyl radical, phenyl radical, or cyclohexyl radical. It is preferred that A be a hydroxy radical or an alkoxy radical. $R^1$ represents divalent hydrocarbon radical, such as —CH$_2$—, —CH$_2$CH$_2$—, —CH$_2$—CH$_2$—CH$_2$, —CH(CH$_3$)CH$_2$—, —(CH$_2$)$_4$—, and other alkylene radicals, or —(CH$_2$)$_2$—C$_6$H$_4$—. The use of an ethylene radical or propylene radical is most common. In (A) hereinabove m and n are integers having a value of 1 or greater. In order to ensure good softness, smoothness, elastic resilience and compressive recovery, the viscosity must be over 50 cSt (centistokes) at 25° C., and is preferably between 300–10,000 cSt at 25° C. The value of a, an integer, is from 0 to 5, usually 0 or 1. This component can be prepared easily using the method disclosed in Japanese Patent Application No. 53-98499 [98,499/78] which teaches that an excess of water is used to hydrolyze an alkoxysilane represented by formula H$_2$N(CH$_2$)$_3$Si(CH$_3$)(OCH$_3$)$_2$, the obtained hydrolyzed product is then mixed with dimethylcyclopolysiloxane and the mixture is heated at 80°–100° C. using a basic catalyst, such as caustic soda, (but a terminal blocking agent is not used) to induce an equilibrium reaction. After the desired viscosity is reached, acid is used to neutralize the basic catalyst.

The organopolysiloxane containing the epoxy radical-containing organic radicals and used as component (B) is represented by the aforementioned formula, in which R represents a substituted or unsubstituted monovalent hydrocarbon radical, such as a methyl radical, ethyl radical, propyl radical, dodecyl radical, vinyl radical, phenyl radical, β-phenylethyl radical, or 3,3,3-trifluoropropyl radical. There is no need to have all the R's be identical in a molecule, The R's are usually methyl radicals or a combination of methyl radicals and other radicals. The epoxy radical-containing monovalent hydrocarbon group represented by E is represented by the following formula:

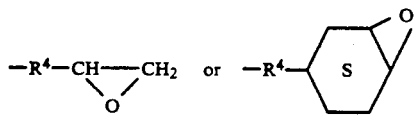

wherein $R^4$ is any divalent organic radical, such as methylene radical, ethylene radical, propylene radical, decylene radical, phenylene radical, hydoxylated hydrocarbon residual radical, chloroethylene radical, fluoroethylene radical, —$CH_2OCH_2CH_2CH_2$—, —$CH_2CH_2OCH_2CH_2$—, —$CH_2CH_2OCH(CH_3)CH_2$—, or —$CH_2OCH_2CH_2OCH_2CH_2$—. B is selected from the group consisting of substituted monovalent hydrocarbon radicals, unsubstituted monovalent hydrocarbon radicals, and epoxy radical-containing organic groups, x has a value from 0 to 25, y has a value from 1 to 30. In order to ensure that each molecule contains at least 3 epoxy radical-containing groups represented by E, when the two terminal groups of (B) are epoxy radical- containing organic radicals represented by E, y has a value of at least 1. It is preferred that the ratio of y/(x+y) be from 0.2 to 1.0 to induce reaction with the amino radicals of component (A) so as to acquire elastic resilience and compressive recovery.

For component (B), in order to induce a crosslinking reaction with the amino radicals in component (A) so as to impart elastic resilience and compressive recovery as well as resistance to permanent setting for the surface of the polyester fibers, at least 3 epoxy radical-containing monovalent organic groups should be contained in each molecule. These epoxy radicals, however, may be present anywhere in the molecular configuration of the organopolysiloxane. The value of x is preferably from 0 to 2. If the value is too large, although the smoothness is improved, the elastic resilience and compressive recovery are degraded, and the resistance to permanent setting is decreased which is undesirable. The preferable ranges of x and y are such that x has a value from 0 to 10 and y has a value from 5 to 20 and it is highly preferred that x is equal to 0, and that y have a value from 5 to 10. Component (B) may be prepared using the additional reaction described in Japanese Patent Nos. [Kokoku]33-9969 (9,969/58) and [Kokoku]36-1293 (1,293/61).

For 100 parts by weight of component (A) used to impart smoothness and softness, the amount of component (B) that leads to Rood elastic resilience and compressive recovery should be 1-50 parts by weight, preferably 5-20 parts by weight. If the amount of component (B) added is smaller than 1 part by weight, the elastic resilience and compressive recovery are poor. On the other hand, if the amount of component (B) is over 50 parts by weight, the smoothness and the lubricating properties are poor.

Component (A) and component (B) are dissolved in an organic solvent, such as toluene, xylene, or another aromatic organic solvent, hexane, heptane, mineral terpene, or another aliphatic hydrocarbon solvent, perchloroethylene, or trichloroethylene. Then, at an amount of 0.1–1.5% with respect to polyester fibers in the form of staple fibers or in tow form, the solution is applied continuously and uniformly on the fibers, followed by evaporation of the organic solvent and then heating at a temperature of 130°–200° C. for crosslinking, forming polyester fibers with excellent smoothness, lubricating property, elastic resilience and compressive recovery. The processed polyester fibers can be used to make padding cotton (stuffing/wadding material). Although processing can be performed using the aforementioned organic solvent, usually it is preferred that a nonionic or cationic surfactant or its emulsion composition be used. For example, one or several types of the following may be used: polyoxyalkylene alkyl ethers, polyoxyalkylene alkylphenol ethers, polyoxyalkylene alkyl esters, sorbitan alkyl esters, polyoxyalkylene sorbitan alkyl esters, aliphatic amines, quaternary ammonium salts, or alkyl pyridinium salts. The amount of the emulsifiers added usually should be 5–30 parts by weight with respect to 100 parts by weight of the sum of components (A) and (B). Component (A) and component (B) may be emulsified by the aforementioned surfactants, respectively, and the emulsions of component (A) and component (B) are blended before application, or, the organopolysiloxanes as components (A) and (B) may be uniformly blended with each other and then emulsified. The emulsions may be prepared by any of the commonly accepted methods such as those employing a propeller-type stirrer, colloidal mill, homogenizer, homomixer, line mixer, or sonorator (ultrasound mixer). In addition to components (A) and (B), a small amount of other ingredients may be added such as amino- or epoxysilanes, dimethylpolysiloxanes, preservatives, fungicides, static inhibitors, or rust inhibitors.

In the following examples, this invention will be explained in greater detail. In the examples described hereinbelow, parts and % refer to parts by weight and weight percent, respectively unless otherwise indicated. The viscosity refers to values measured at 25° C.

EXAMPLE 1

3.6 parts of the amino radical-containing organopolysiloxane (with viscosity of 720 cSt) represented by formula

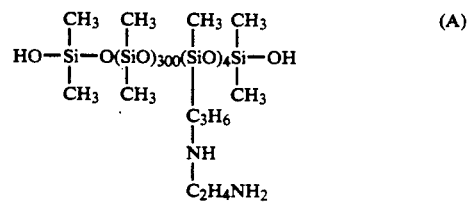

and 0.15 parts of the epoxy radical-containing organopolysiloxane (viscosity of 270 cSt) represented by formula

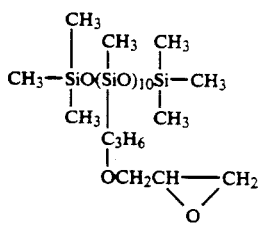

(B)

were uniformly dissolved in 71.25 parts of toluene to form a toluene solution of 5% of organopolysiloxane (Processing Solution A). Then 10 parts of Processing Solution A were uniformly sprayed onto 100 g of staple fibers of polyester fibers of the size of 6 denier (6.66 kg/m) and having a fiber length of 65 mm, followed by drying, by blowing, and then heat treatment at 150° C. for 5 min. The adhered amount of organopolysiloxane with respect to fibers was 0.5%. The processed padding cotton made of polyester fibers was processed to cotton for comforters using an RM1100 model LABOR MIXER produced by the Taxtest Co. (Switzerland). Then, according to the measurement method defined in JISL-2001, a cylindrical weight of 3.5 kg or 25 kg was set on the sample, with an area of compression of 100 cm$^2$, for 2 weeks The recovery was then measured, and the permanent setting (%) was measured as follows, Permanent setting (%)=100− recovery after setting for 2 weeks (%). The static and dynamic frictional coefficients were measured using a $\mu$-meter (produced by Daiei Kagaku Seiki Seisakysho K.K.).

For the purpose of comparison, the same processing operation was also performed using the following types of processing solutions:

Processing Solution B: Prepared by dissolving 3.75 parts of the organopolysiloxane represented by formula (A) in Example 1 in 71.25 parts of toluene.

Processing Solution C: Prepared by dissolving 3.75 parts of the organopolysiloxane represented by formula (B) in Example 1 in 71.25 parts of toluene.

Processing Solution D: Prepared by dissolving 3.6 parts of the organopolysiloxane represented by formula (A) in Application Example 1 and 0.15 part of an epoxy radical-containing silicone oil with a viscosity of 142 cSt and represented by the formula

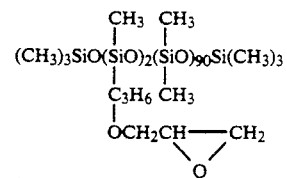

(C)

in 71,25 [parts] of toluene.

Processing Solution E: Prepared by dissolving 3.6 parts of the organopolysiloxane represented by formula (A) used in Processing Solution A and, instead of the epoxy-modified silicone oil represented by formula (C), 0.15 parts of the monoepoxide represented by the formula

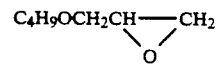

in 71.25 parts of toluene.

Processing Solution F: Prepared by dissolving 3.6 parts of the organopolysiloxane represented by formula (A) used in Example 1 and 0.15 parts of the epoxy radical-containing trimethoxysilane represented by the formula

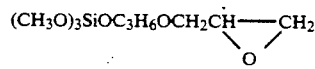

in 71.25 parts of toluene.

The results are listed in Table I. It can be seen that the polyester staple fibers processed by the processing agents of this invention have very high bulkiness, excellent elastic resilience and compressive recovery, very small permanent setting, and small frictional coefficients between yarns, just like that for feather padding. The quality is very high.

TABLE I

| PROCESSING SOLUTION | INVENTION A | COMPARATIVE EXAMPLE | | | | | NOT PRO-CESSED |
|---|---|---|---|---|---|---|---|
| | | B | C | D | E | F | |
| BULKINESS (ml/g) | 115 | 101 | 98 | 101 | 105 | 106 | 90 |
| COMPRESS-IBILITY (%) | 83 | 69 | 63 | 72 | 71 | 72 | 48 |
| COMPRESSIVE RECOVERY (%) | 95 | 88 | 86 | 88 | 89 | 87 | 85 |
| PERMANENT SETTING (%) | 23 | 33 | 33 | 32 | 31 | 29 | 35 |
| DYNAMIC FRICTIONAL COEFFICIENT | 0.119 | 0.125 | 0.188 | 0.123 | 0.145 | 0.140 | 0.318 |
| STATIC FRICTIONAL COEFFICIENT | 0.098 | 0.109 | 0.195 | 0.108 | 0.125 | 0.122 | 0.225 |
| EVALUATION FOR USE IN COMFORTERS | EXCELLENT (FEATHER-LIKE FEEL) | FAIR | FAIR | FAIR | FAIR | FAIR | POOR |

EXAMPLE 2

To 4.5 parts of trimethylnonylpolyethylene oxide (6 mol) adduct (Tergitol(R) TMN-6, product of Union Carbide Co.) were added 35 parts of the amino radical-containing organopolysiloxane represented by formula (A) used in Example 1, followed by stirring for about 10 min. Then 5 parts of the epoxy radical-containing organopolysiloxane represented by formula (B) and 1.5 parts of a nonylphenolpolyoxyethylene oxide (20 mol) adduct were added, followed by mixing for 10 min. Then 8.5 parts of water were added, followed by mixing for 5 min. The mixture was passed through a colloid-mill emulsifier once. Then 51.5 parts of water were added, followed by blending to form a uniform emulsion. Next 1.25 parts of the emulsion formed in this way were dissolved in 15 parts of water to form Processing Solution G. Processing Solution G was sprayed uniformly onto 100 g of hollow polyester staple fibers (6 denier(6.66 kg/m) by 70 mm) for making comforters, followed by drying at 105° C. for 10 min. and then heated at 150° C. for 10 min. Then, in the same way as in Example 1, the bulkiness, compressibility, compressive recovery and permanent setting rate were measured.

For comparison, Processing Solution H was prepared as follows: an emulsion was prepared using only the amino radical-containing organopolysiloxane represented by formula (A), without using the epoxy radical-containing organopolysiloxane represented by formula (B); 1.3 parts of the emulsion were mixed with 0.05 part of the epoxy radical-containing trimethoxysilane represented by the formula

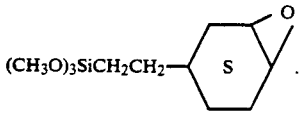

After the mixture was blended uniformly, 15 parts of water were added for dilution, forming Processing Solution H. For this Processing Solution H, the characteristics were evaluated in the same way as in the above. The results are listed in Table II. The sample processed by the composition of this invention has high bulkiness, compressibility and compressive recovery. It can be used to manufacture feather-like hollow (with good thermal insulating property) comforters with small permanent setting.

EXAMPLE 3

3.8 parts of the amino radical-containing organopolysiloxane (viscosity 1150 cSt) represented by formula $$H_3CO-\underset{\underset{CH_3}{|}}{\overset{\overset{CH_3}{|}}{Si}}O(SiO)_{400}(\underset{\underset{C_3H_6}{|}\atop\underset{NH_2}{|}}{\overset{\overset{CH_3}{|}}{SiO}})_4\overset{\overset{CH_3}{|}}{\underset{\underset{CH_3}{|}}{Si}}-OCH_3 \quad (D)$$

and 0.2 part of the organopolysiloxane (viscosity of 230 cSt) represented by formula:

$$CH_3-\overset{\overset{CH_3}{|}}{\underset{\underset{CH_3}{|}}{Si}}O(SiO)_3-(SiO)_{10}\overset{\overset{CH_3}{|}}{\underset{\underset{CH_3}{|}}{Si}}-CH_3 \quad (E)$$

were dissolved in 96 parts of 1,1,1-trichloroethane to form Processing Solution I. Next 10 parts of the processing solution were used to process a polyester staple cotton in the same way as in Example 1. For the processed polyester staple cotton, the bulkiness, compressibility, compressive recovery and permanent setting were measured.

For comparison, Processing Solutions J and K were prepared by dissolving 4 parts of the amino radical-containing organopolysiloxanes represented by formulas D and E, respectively, in 96 parts of 1,1,1-trichloroethane. The characteristics of these processing solutions were evaluated in the same way as in the above, with the results listed in Table III. The padding cotton processed by the processing solution of this invention has a feath-

TABLE II

| PROCESSING SOLUTION | INVENTION G | COMPARATIVE EXAMPLE | |
|---|---|---|---|
| | | H | NOT PROCESSED |
| BULKINESS (ml/g) | 138 | 121 | 113 |
| COMPRESSIBILITY (%) | 81 | 71 | 53 |
| COMPRESSIVE RECOVERY (%) | 95 | 90 | 87 |
| PERMANENT SETTING (%) | 24 | 29 | 30 |
| EVALUATION FOR USE IN COMFORTERS | EXCELLENT (FEATHER-LIKE FEEL) | FAIR (LIKE HOLLOW COTTON) | POOR (LIKE HOLLOW COTTON) | er-like feel, with excellent bulkiness, compressibility, compressive recovery, and small permanent setting.

TABLE III

| PROCESSING SOLUTION | INVENTION I | COMPARATIVE EXAMPLE | | |
|---|---|---|---|---|
| | | J | K | NOT PROCESSED |
| BULKINESS (ml/g) | 113 | 99 | 100 | 90 |
| COMPRESSIBILITY (%) | 81 | 70 | 68 | 48 |
| COMPRESSIVE RECOVERY (%) | 93 | 88 | 87 | 85 |
| PERMANENT SETTING (%) | 25 | 33 | 33 | 35 |

TABLE III-continued

| PROCESSING SOLUTION | INVENTION I | COMPARATIVE EXAMPLE | | |
|---|---|---|---|---|
| | | J | K | NOT PROCESSED |
| EVALUATION FOR USE IN COMFORTERS | EXCELLENT (FEATHER-LIKE FEEL) | FAIR | FAIR | POOR |

That which is claimed is:

1. A composition consisting of:
   (A) 100 parts by weight of an amino radical-containing organopolysiloxane having the formula:

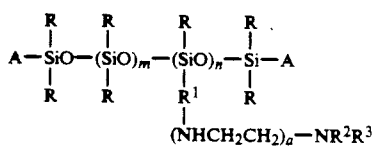

(NHCH$_2$CH$_2$)$_a$—NR$^2$R$^3$ wherein R is a monovalent hydrocarbon radical having from 1 to 20 carbon atoms R$^1$ is a divalent hydrocarbon radical, R$^2$ is a hydrogen atom or monovalent hydrocarbon radical, R$^3$ is a hydrogen atom or monovalent hydrocarbon radical, A is a hydroxy radical or an alkoxy radical, m is 1 or has a value greater than 1, n is 1 or has a value greater than 1, an integer from 0 to 5, said organopolysiloxane (A) having a viscosity greater than 50 centistokes at 25° C.; and (B) 1–50 parts by weight of an organopolysiloxane containing at least 3 epoxy radical-containing organic groups in each molecule and having the formula:

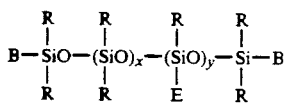

wherein R is a substituted or unsubstituted monovalent hydrocarbon radical, E is an epoxy radical-containing organic group, B is selected from the group consisting of substituted monovalent hydrocarbon radicals, unsubstituted monovalent hydrocarbon radicals, and epoxy radical-containing organic groups, x has a value from 0 to 25, y has a value from 1 to 30, and wherein the value of x+y is from 1 to 30.

2. A composition according to claim 1, wherein R in (A) and (B) is methyl.

3. A composition according to claim 1, wherein R$^1$ is an alkylene radical.

4. A composition according to claim 3, wherein the alkylene radical is selected from the group consisting of ethylene and propylene.

5. A composition according to claim 1, wherein the viscosity of Component (A) is from 300 to 10,000 centistokes at 25° C.

6. A composition according to claim 1, wherein the value of a is 0 or 1.

7. A composition according to claim 1, wherein E is a group having its formula selected from the group consisting of:

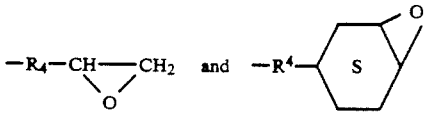

and wherein R$^4$ is a divalent organic radical.

8. A composition according to claim 7, wherein R$^4$ is a radical selected from the group consisting of a methylene radical, ethylene radical, propylene radical, decylene radical, phenylene radical, hydoxylated hydrocarbon residual radical, chloroethylene radical, fluoroethylene radical, —CH$_2$OCH$_2$CH$_2$CH$_2$— radical, —CH$_2$CH$_2$OCH$_2$CH$_2$— radical, —CH$_2$CH$_2$OCH(CH$_3$)CH$_2$— radical, and —CH$_2$OCH$_2$CH$_2$OCH$_2$CH$_2$— radical.

9. A composition according to claim 1, wherein x has a value from 0 to 10 and y has a value from 5 to 20.

10. A composition according to claim 1, wherein x is 0 and y has a value from 5 to 10.

11. A composition consisting of:
    (A) 100 parts by weight of an amino radical-containing organopolysiloxane having the formula:

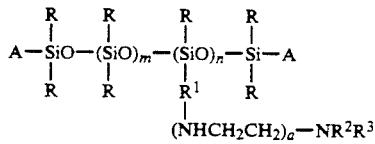

(NHCH$_2$CH$_2$)$_a$—NR$^2$R$^3$ wherein R is a monovalent hydrocarbon radical having from 1 to 20 carbon atoms, R$^1$ is a divalent hydrocarbon radical, R$^2$ is a hydrogen atom or monovalent hydrocarbon radical, R$^3$ is a hydrogen atom or monovalent hydrocarbon radical, A is a hydroxy radical or an alkoxy radical, m is 1 or has a value greater than 1, n is 1 or has a value greater than 1, a is an integer from 0 to 5, said organopolysiloxane (A) having a viscosity of greater than 50 centistokes at 25° C.;

(B) 1–50 parts by weight of an organopolysiloxane containing at least 3 epoxy radical-containing organic groups in each molecule and having the formula :

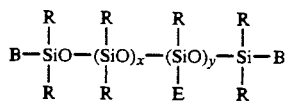

wherein R is a substituted or unsubstituted monovalent hydrocarbon radical, E is an epoxy radical-containing organic group, B is selected from the group consisting of substituted monovalent hydrocarbon radicals, unsubstituted monovalent hydrocarbon radicals, and epoxy radical-containing organic groups, x has a value from 0 to 25, y has a value from 1 to 30, and wherein the value of x+y is from 1 to 30; and (C) an emulsifier.

12. A composition according to claim 11, wherein the emulsifier is selected from the group consisting of polyoxyalklene alkyl ethers, polyoxyalkylene alkylphenol ethers, polyoxyalkylene alkyl esters, sorbitan alkyl esters, aliphatic amines, quaternary ammonium salts, and alkyl pyridinium salts.

13. A composition according to claim 12, wherein said sorbitan alkyl esters are polyoxyalkylene sorbitan alkyl esters.

14. A composition consisting of:

(A) 100 parts by weight of an amino radical-containing organopolysiloxane having the formula:

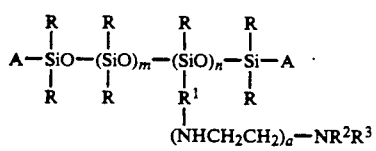

wherein R is a monovalent hydrocarbon radical having from 1 to 20 carbon atoms, $R^1$ is a divalent hydrocarbon radical, $R^2$ is a hydrogen atom or monovalent hydrocarbon radical, $R^3$ is a hydrogen atom or monovalent hydrocarbon radical, A is a hydroxy radical or an alkoxy radical, m is 1 or has a value greater than 1, n is 1 or has a value greater than 1, a is an integer from 0 to 5, said organopolysiloxane (A) having a viscosity of greater than 50 centistokes at 25° C.;

(B) 1–50 parts by weight of an organopolysiloxane containing at least 3 epoxy radical-containing organic groups in each molecule and having the formula :

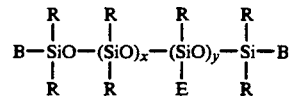

wherein R is a substituted or unsubstituted monovalent hydrocarbon radical, E is an epoxy radical-containing organic group, B is selected from the group consisting of substituted monovalent hydrocarbon radicals, unsubstituted monovalent hydrocarbon radicals, and epoxy radical-containing organic groups, x has a value from 0 to 25, y has a value from 1 to 30, and wherein the value of $x+y$ is from 1 to 30; and (C) an organic solvent.

15. A composition according to claim 14, wherein the organic solvent is selected from the group consisting of toluene, xylene, hexane, heptane, mineral terpene, perchloroethylene, 1,1,1, -trichloroethane, and trichloroethylene .

16. In a method of treating polyester fibers comprising applying to the fibers a silicone composition and then heating the fibers, the improvement comprising using as the silicone composition the composition of claim 1.

17. In a method of treating polyester fibers comprising applying to the fibers a silicone composition and then heating the fibers, the improvement comprising using as the silicone composition the composition of claim 11.

18. In a method of treating polyester fibers comprising applying to the fibers a silicone composition and then heating the fibers, the improvement comprising using as the silicone composition the composition of claim 14.

* * * * *